United States Patent [19]

Stearns et al.

[11] 4,422,287

[45] Dec. 27, 1983

[54] FUEL CONTROL FOR GAS TURBINE ENGINES

[75] Inventors: Charles F. Stearns, East Longmeadow, Mass.; Herbert W. Tutherly, Windsor, Conn.

[73] Assignee: United Technologies Corporation, Hartford, Conn.

[21] Appl. No.: 191,548

[22] Filed: Sep. 29, 1980

[51] Int. Cl.³ .............................................. F02C 9/28
[52] U.S. Cl. ................................................ 60/39.281
[58] Field of Search .................................. 60/39.28 R

[56] References Cited

U.S. PATENT DOCUMENTS 3,913,316 10/1975 Canale et al. .................. 60/39.28 R
4,229,937 10/1980 Smith ............................. 60/39.28 R
4,326,376 4/1982 Stearns et al. .................. 60/39.28 R Primary Examiner—Louis J. Casaregola
Assistant Examiner—Jeffrey A. Simenauer
Attorney, Agent, or Firm—Charles A. Warren

[57] ABSTRACT

The basic gas turbine engine hydromechanical fuel control is adaptable to different engine configurations such as turbofan, turboprop and turboshaft engines by incorporating in the main housing those elements having a commonality to all engine configurations and providing a removable block for each configuration having the necessary control elements and flow passages required for that particular configuration. That is to say, a block with the elements peculiar to a turbofan engine could be replaced by a mating block that includes those elements peculiar to a turboshaft engine in adapting the control for a turboshaft configuration. Similarly another block with those elements peculiar to a turboprop engine could replace any of the other blocks in adapting the control to a turboprop configuration. Obviously the basic control has the necessary flow passages terminating at the interface with the block and these flow passages mate with corresponding passages in the block.

3 Claims, 2 Drawing Figures

FUEL CONTROL FOR GAS TURBINE ENGINES

DESCRIPTION

1. Technical Field

This invention relates to hydromechanical fuel controls that are adaptable for multi-configuration gas turbine engines such as turbofan, turboprop and turboshaft engines.

2. Background Art

With increasing demand for small aircraft using turbofan, turboprop and turboshaft engines, there is an increasing demand for more sophisticated controls. The hybrid system combining hydromechanical controls with electronic digital controls appears to be the most promising. However, most controls are designed and manufactured for a particular type of turbine engine and are not adaptable for the other types. A basic system having a high commonality with all types is desirable with only a minimum of change in adapting from one type to another.

A hybrid system utilizing a basic hydromechanical control and adapted for turbofan engines is known and has been extensively tested in service. This type of system is described in the copending application of Stearns, Ser. No. 069,141, filed Aug. 23, 1979, now U.S. Pat. No. 4,326,376, having a common assignee with this application. Such a system that could be readily adapted to turboprop and/or turboshaft engines would minimize design, manufacturing and testing expense and problems.

DISCLOSURE OF INVENTION

A copending application of Stearns, Ser. No. 191,547, describes a control adaptable to any of the types of gas turbine engines by the substitution of plugs in several recesses in the fuel control housing. Ducts leading fuel to the engine and directing control fluids within the control intersect the recesses and the substitution of differently ported plugs permits the conversion from one type of engine to another with a minimum of changes. The present invention is to some extent an improvement on this device by having, instead of a plurality of plugs, a removable block attached to the housing and having the necessary passages and valves therein to adapt the control to a particular engine type. Obviously those conduits where alteration is necessary terminate at the interface between the housing and the modification block to communicate with conduits in the block to establish the desired functional modifications.

A feature of the invention is therefore a block adapted for removable attachment to the basic fuel control housing with suitable conduits and valves therein arranged for a particular engine type and cooperating with fuel and control conduits in the basic control to effect the necessary changes in the overall control to suit the particular engine type.

Another feature of the invention is an attachment block adapted for a particular engine type but also adapted to incorporate therein any particular control modification desired by a user of the control. That is to say, this modification block may incorporate the elements of a control that are required by a particular engine and/or a user of that engine in a particular aircraft.

According to the invention, the basic hydromechanical control is arranged to permit the attachment to the housing of an adaptive block that will route fuel flow lines and/or pressure sensing lines either simply or through restrictive valves or orifices to accomplish the desired scheduling for any particular engine application. In this manner the elements of the control that are common to all engine configurations are incorporated in the basic housing and those elements peculiar to a particular engine configuration and/or to a particular engine installation or user are included in the removable block that is attached to the base housing and the fuel and pressure lines communicate between the housing and the block through the interface therebetween.

The foregoing and other objects, features and advantages of the present invention will become more apparent from the following description of preferred embodiments and accompanying drawings.

BEST MODE FOR CARRYING OUT THE INVENTION

Figure 2:
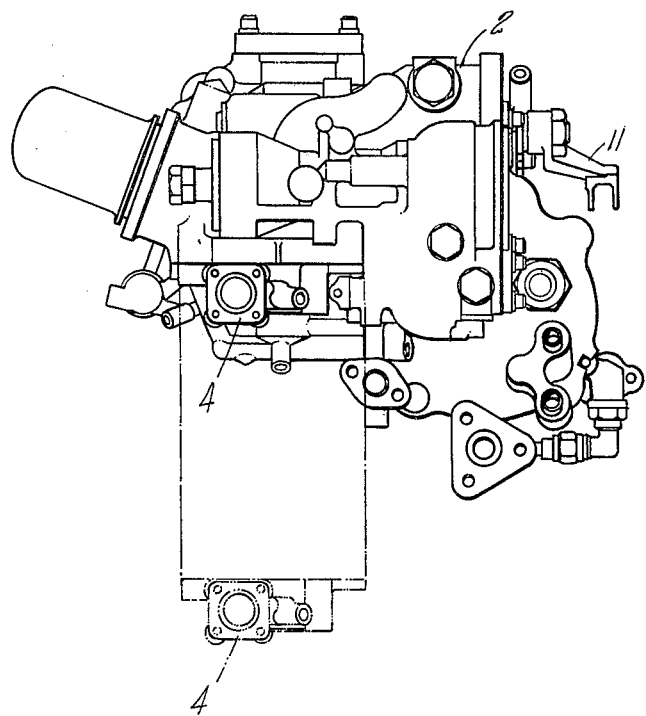
FIG. 2 is an elevation view of a fuel control with the removable adapter block shown positioned for assembly in broken lines and shown assembled in full lines.

The invention involves the use of a basic hydromechanical control housing 2 in which are incorporated those elements of a control that have the commonality for several types of gas turbine configurations such as turbofan, turboprop and turboshaft. To adapt the basic control to any particular engine configuration the basic control has attached thereto an adapter block 4 shown in elevation in FIG. 2 in which are incorporated those elements peculiar and essential to one particular engine. In this way block 4 which is adapted for a turboshaft engine may be replaced by a different block that would include the essential elements to another particular engine, as for example, either the turboprop or the turbofan engine. This removable block is another way of accomplishing the results of the replaceable plugs of the copending application, Ser. No. 191,547 above-mentioned. This concept adds another logic in that should any customer desire any particular control mechanism not in the basic control unit, a particular block may be designed and built to incorporate this particular feature without modification of the basic unit in any way.

It will be understood that the control elements in the diagram above the line 6 representing the mating interfaces of the main housing and the block are in the main housing, those elements below the line are in the adapter block. The basic control, that is the structure in the main housing is described in detail in Stearns, Ser. No. 069,141 now U.S. Pat. No. 4,326,376 and reference is made to that application for further detail.

Figure 1:
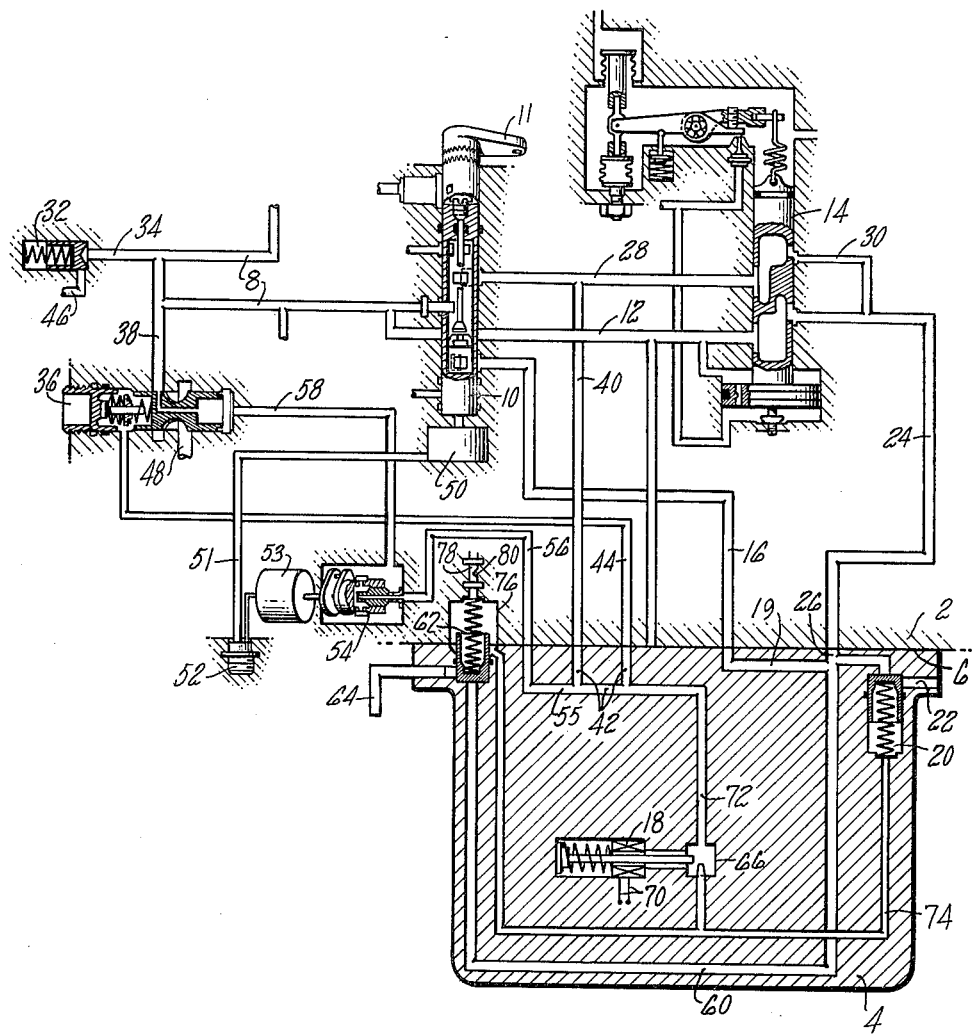
FIG. 1 is a diagrammatic view of the fuel control with parts in structural detail to show the invention as applied to a turbofan engine.

Referring now to FIG. 1, fuel is supplied from a pump (not shown) to a fuel inlet passage or duct 8 leading to the throttle valve 10. This valve is actuated by a power lever 11 under the control of the pilot. A bypass line 12 from line 8 leads past the throttle valve to the condition responsive valve 14 and is the deceleration line. From throttle valve 10 a minimum flow or starting flow line 16 leads to the interface 6 and mates with the line 18 past a minimum pressure and shut-off valve 20 to the starting fuel outlet 22 to the engine. From the bypass line 12 fuel is controlled by the condition responsive valve and from this valve goes by line 24 to the interface where it mates with the line 26 in the block connecting with line 18. Fuel flow in an accelerator line 28 from the throttle valve to the condition responsive valve and thence through this valve in line 30 and line 24 to the engine provides another fuel line to the engine.

The inlet line 8 has a high pressure relief valve 32 connected thereto by a branch line 34 and downstream thereof is a pressure regulating valve 36 connected by a branch line 38. A pressure sensing line 40 from a line 28 downstream of the throttle valve mates at the interface with a line 42 in the block having both its ends at the interface and thence through line 44 in the housing to the pressure regulating valve. Both the valve 32 and the pressure regulating valve 36 have outlets 46 and 48 respectively.

The position of the throttle valve is signalled to the electronic control unit by a potentiometer 50 on the end of the valve and leads 51 to the electronic control connector 52. The electronic control drives a stepper motor 53 that stops in whatever position failure of the electronic control unit occurs and operates through a valve 54 to deliver a fluid pressure signal from the passage 42 by way of branch passage 55 in the block and mating passage 56 leading to the valve 54 and thence through line 58 to the end of the pressure regulating valve.

The block also has a fuel line 60 therein from the connection of lines 18 and 26 to a minimum pressure and shut-off valve 62 and thence through main outlet passage 64 to the engine. Thus, in this configuration the starting and minimum flow is a separate connection to the engine than the main flow. This may be for example a particular customer's requirement for the engine configuration he is using.

The two shut-off valves 20 and 62 are actuated by a valve 66 moved by an overspeed solenoid valve 68 under the control of the electronic control unit through leads 70 or by the throttle valve providing that it dumps the low side of the regulator to pump inlet pressure. The valve 66 is in a line 72 in the block extending from line 42 and delivers control fluid through line 74 communicating therewith also in the block.

In the arrangement shown, the shut-off valve 62 extends beyond the interface such that a part of it is in a recess 76 in the housing. In the housing is also a restriction 78 in an outlet passage 80 leading to drain that permits a control over the movement of this valve.

The particular mechanism of the condition responsive valve and the mechanism that actuates it as well as the function and arrangement of the metering ports in the throttle valve and condition responsive valve are not described in detail as they are not a part of the invention. Reference is made to Stearns, Ser. No. 069,141 now U.S. Pat. No. 4,326,376 above-mentioned for a more detailed description if desired.

Thus the concept of the invention is a fuel control device that incorporates the essential elements of the basic control that are common to any of several engine configurations. This control may then be adapted to the requirements of any particular configuration and/or any particular customer's requirement by mounting thereon an adapter block that includes those elements peculiar to a particular engine configuration. The connection between the elements in the base housing and those in the adapter block are made across the interfaces of the block and housing through mating passages for fuel flow and control fluid in the two parts. It will be understood that once the necessary passages are made in the basic housing any adapter block can be made to match those passages and to incorporate the desired fuel flow or control elements therein. This is a particular advantage in that the basic control which has been tested and proven can be utilized for all engine configurations with the certainty of its dependable operation and the few elements positioned in the block are readily added as a unit to the base control in adapting to a particular engine configuration.

More in detail the passages and devices of the three plugs of Ser. No. 191,547 for the turbofan engine may be incorporated in one block as a different adaptation for the present device. Similarly the passages and devices of the three plugs for the turboprop engine may be incorporated in another block but may replace the block shown in adapting the device to a turboprop engine. Further, obviously the passages and devices of the plugs for the turboshaft configuration may be incorporated in another block. It will be obvious that the passages in the basic control that intersect the bores in the above-identified application must be properly located at the interface with the block in this application.

Although this invention has been shown and described with respect to a preferred embodiment, it will be understood by those skilled in the art that various changes in form and detail thereof may be made without departing from the spirit and scope of the claimed invention.

We claim:

1. A fuel control adapted for different gas turbine engine configurations including:
   a main control housing having an interface thereon;
   a throttle valve in said housing;
   said housing having inlet and outlet passages for said throttle valve said outlet passage terminating at the interface;
   a condition responsive valve in said housing;
   said housing having an inlet passage from the throttle valve to said condition responsive valve and an outlet passage from said condition responsive valve to the interface;
   a pressure regulating valve in said housing for maintaining the pressure drop across the throttle valve;
   said housing having a first passage and a second passage comprised of a series of passages from the inlet and outlet passages respectively of the throttle valve to said pressure regulating valve;
   said housing having another fluid passage from the throttle valve to said interface;
   an adapter block removably attached to said housing at said interface, said block having a cooperating interface;
   control means in said block to affect the flow of fuel to the engine;
   said block having a fuel passage having its inlet at said interface to mate with the outlet passage from the condition responsive valve and an outlet in said block spaced from the interface for connection to the engine;
   said block having a branch passage from said fuel passage to the interface to mate with the outlet passage from the throttle valve to the interface;
   pressure responsive means in said fuel passage in the block and responsive to said control means; and
   said block having another fluid passage from the interface through the control means to the pressure responsive means, said another fluid passage in said block having its inlet end at the interface to mate with said another fluid passage in said housing.

2. A fuel control as in claim 1 in which the block has a second branch passage from said fuel passage to an outlet in said block, said outlet being spaced from the interface for connection to the engine, and said second branch having a pressure actuated shutoff valve therein and an actuating fluid passage in said block from the control means to said shutoff valve.

3. A fuel control as in claim 1 in which the actuating fluid for the control means is supplied through a passage in the block and which said passage in the block has its inlet end at the interface to mate with a cooperating passage in the housing from the pressure regulating valve to the interface and which communicates with said another fluid passage in said block.

* * * * *